(12) United States Patent
Ueda

(10) Patent No.: US 9,008,488 B2
(45) Date of Patent: Apr. 14, 2015

(54) VIDEO RECORDING APPARATUS AND CAMERA RECORDER

(71) Applicant: Panasonic Corporation, Osaka (JP)

(72) Inventor: Hisataka Ueda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/178,576

(22) Filed: Feb. 12, 2014

(65) Prior Publication Data

US 2014/0286620 A1  Sep. 25, 2014

(30) Foreign Application Priority Data

Mar. 21, 2013 (JP) ................. 2013-057610

(51) Int. Cl.

| | | |
|---|---|---|
| H04N 5/935 | (2006.01) | |
| H04N 5/77 | (2006.01) | |
| H04N 5/76 | (2006.01) | |
| H04N 5/91 | (2006.01) | |
| H04N 9/82 | (2006.01) | |
| G11B 27/00 | (2006.01) | |

(52) U.S. Cl.
CPC ........ *H04N 5/76* (2013.01); *G11B 27/00* (2013.01); *H04N 5/91* (2013.01); *H04N 9/8205* (2013.01)

(58) Field of Classification Search
USPC .................. 386/210–211, 224–231
See application file for complete search history.

(56) References Cited

U.S. PATENT DOCUMENTS

| | | | |
|---|---|---|---|
| 2002/0015582 A1* | 2/2002 | Matsumoto et al. | 386/111 |
| 2005/0232574 A1* | 10/2005 | Kawai | 386/46 |
| 2006/0245721 A1 | 11/2006 | Moriya et al. | |
| 2007/0180283 A1 | 8/2007 | Shinkai et al. | |
| 2012/0114310 A1* | 5/2012 | Hymel et al. | 386/285 |
| 2014/0161417 A1* | 6/2014 | Kurupacheril et al. | 386/241 |

FOREIGN PATENT DOCUMENTS

| | | |
|---|---|---|
| JP | 2006-245756 A | 9/2006 |
| JP | 2006-303594 A | 11/2006 |
| JP | 2007-150782 A | 6/2007 |
| JP | 2009-225116 A | 10/2009 |
| JP | 2012-156808 A | 8/2012 |

* cited by examiner

*Primary Examiner* — Nigar Chowdhury

(74) *Attorney, Agent, or Firm* — Renner, Otto, Boisselle & Sklar, LLP

(57) ABSTRACT

A video recording apparatus preferentially transmits important video data, while reducing user's operational burdens. An operating section receives operation instructions of a first recording video image. A video recording section records a second recording video image, and records the first recording video image in accordance with the operation instructions input to the operating section. An overlapping period detection section generates overlap information indicating temporal overlap between the recording video images, from an output of the operating section. The video recording section divides the second recording video image into blocks at timing based on recording operation of the first recording video image, and determines priority of the divided blocks based on the overlap information.

10 Claims, 11 Drawing Sheets

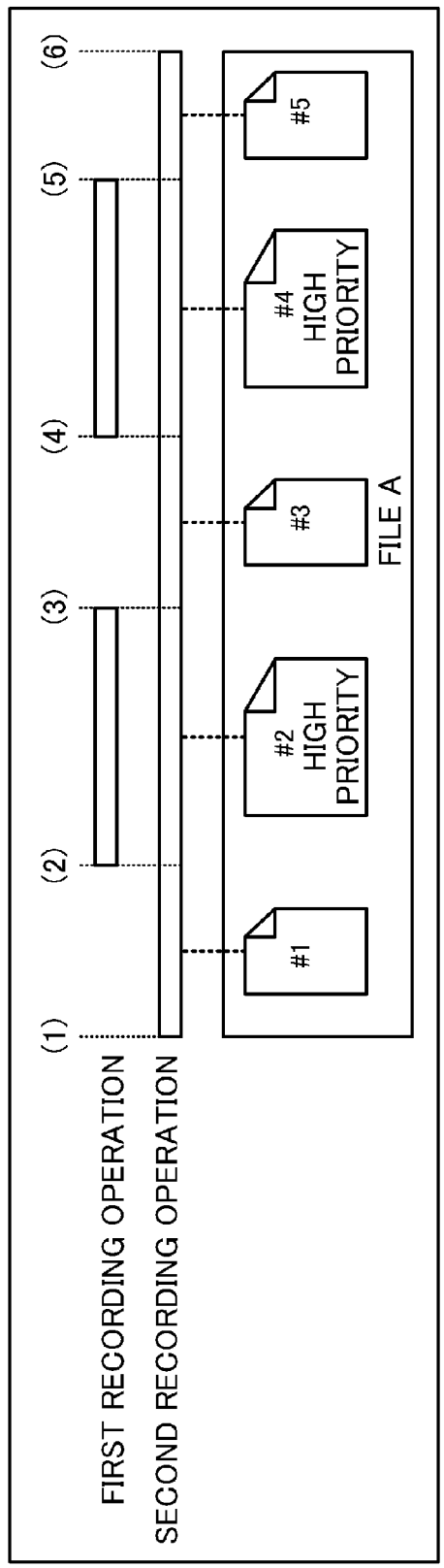

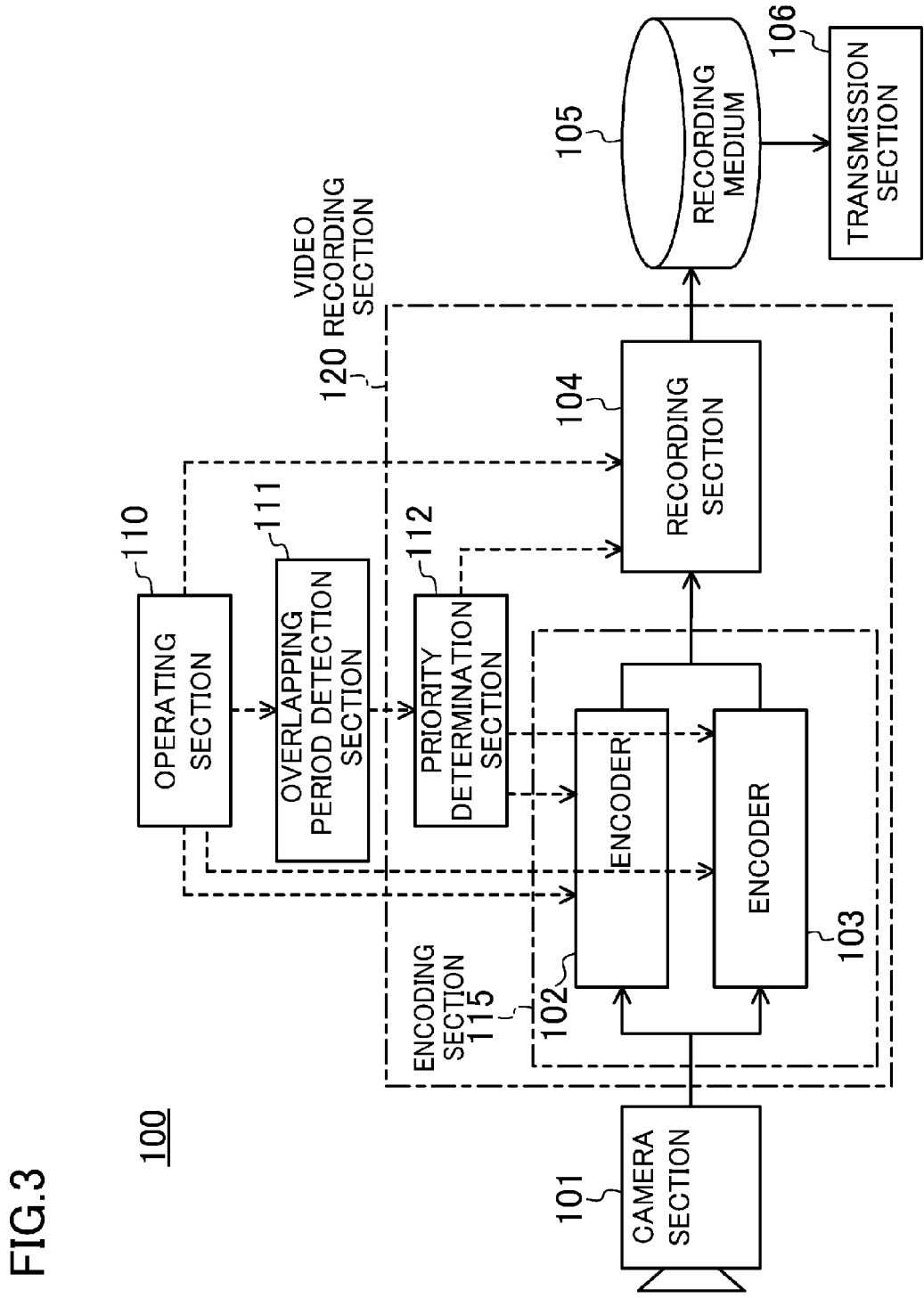

| TIME | RECORDING OPERATION |
|------|---------------------|
| T(1) | 2 |
| T(2) | 1&2 |
| T(3) | 2 |
| T(4) | 1&2 |
| T(5) | 2 |
| T(6) | 0 |

FIG.6

| OFFSET | PRIORITY | RECORDING MODE | MEMO |
|--------|----------|----------------|------|
| 0 | 10 | 2 | START OF #1 |
| 123 | 5 | 1&2 | START OF #2 |
| 234 | 10 | 2 | START OF #3 |
| 345 | 5 | 1&2 | START OF #4 |
| 456 | 10 | 2 | START OF #5 |

FIG.8

| TIME | RECORDING OPERATION |
|---|---|
| T(1) | 2 |
| T(2) | 1&2 |
| T(3) | 2 |
| T(4) | 1&2 |
| T(5) | 2 |
| T(6) | 0 |

| OFFSET | PRIORITY | RECORDING MODE | MEMO |
|---|---|---|---|
| 0 | 10 | 2 | START OF #1 |
| 123 | 5 | 1&2 | START OF #2 |
| 234 | 10 | 2 | START OF #3 |
| 345 | 5 | 1&2 | START OF #4 |
| 456 | 10 | 2 | START OF #5 |

VIDEO RECORDING APPARATUS AND CAMERA RECORDER

CROSS-REFERENCE TO RELATED APPLICATION

This application claims priority to Japanese Patent Application No. 2013-57610 filed on Mar. 21, 2013, the entire disclosure of which is incorporated by reference herein.

BACKGROUND

The present disclosure relates to video recording apparatuses capable of recording a plurality of video data at the same time.

In recent years, apparatuses are becoming common, which record materials such as audio and video data as files in randomly accessible recording media such as optical disks and semiconductor memories. For example, broadcast stations and video production companies edit video images using editing apparatuses including such recording media.

On the other hand, with wide spread of network technologies, techniques have been suggested, which transmit, record, reproduce, and edit recorded audio and video data files, while improving the convenience of the entire operation of video production.

Japanese Unexamined Patent Publication No. 2006-303594 shows a recording apparatus for recording and transmitting video clip data and proxy AV data with low resolution. The video clip data and the proxy AV data with the low resolution are supplied to the recording apparatus. The recording apparatus performs streaming reproduction of the supplied proxy AV data as live video images, applies essence marks as meta data in certain positions of the proxy AV data, and records a meta data file. This reduces the time for editing video materials.

Japanese Unexamined Patent Publication No. 2012-156808 shows a transmission section for dividing image data into a plurality of scenes and transmitting the divided image data. The transmission section transmits priority scenes in preference to non-priority scenes. This efficiently transfers important priority scenes.

SUMMARY

The present disclosure provides a video recording apparatus advantageous in preferentially transmitting important video data, while reducing user's operational burdens.

The video recording apparatus according to the present disclosure records video signals as a plurality of recording image data including first and second recording video images. The apparatus includes an operating section configured to receive user's operation instructions including instructions to start and stop recording the first recording video image; a video recording section configured to record the second recording video image in a recording medium, and record the first recording video image into the recording medium in accordance with the instructions to start and stop recording, which have been input to the operating section; and an overlapping period detection section configured to generate overlap information indicating temporal overlap between the first recording video image and the second recording video image from an output of the operating section. The video recording section divides the second recording video image into blocks at timing based on at least one of start or stop of recording of the first recording video image, and records the divided blocks into the recording medium. The video recording section determines priority of the divided blocks of the second recording video image based on the overlap information. The video recording section generates division information on each divided block of the second recording video image including at least priority information indicating the determined priority and positional information indicating a position of the divided block in the second recording video image, and records the generated division information into the recording medium.

The video recording apparatus according to the present disclosure is advantageous in preferentially transmitting important video data, while reducing user's operational burdens.

BRIEF DESCRIPTION OF THE DRAWINGS

FIG. 2 is a schematic view illustrating example video recording operation according to the embodiment.

FIG. 3 is a block diagram illustrating an example configuration of a camera decoder according to the embodiment.

FIG. 5 illustrates example overlap information.

FIG. 6 illustrates example division information.

FIG. 8 illustrates example generation of the division information from the overlap information.

DETAILED DESCRIPTION

Embodiments are described in detail below with reference to the attached drawings as appropriate. However, unnecessarily detailed description may be omitted. For example, detailed description of well known techniques or repetitive description of the substantially same elements may be omitted. Such omission is intended to prevent the following description from being unnecessarily redundant and to help those skilled in the art easily understand it.

The inventor provides the following description and the attached drawings to enable those skilled in the art to fully understand the present disclosure. Thus, the description and the drawings are not intended to limit the scope of the subject matter defined in the claims.

First Embodiment

1. Configuration 1-1. System Connection Configuration

Figure 1:
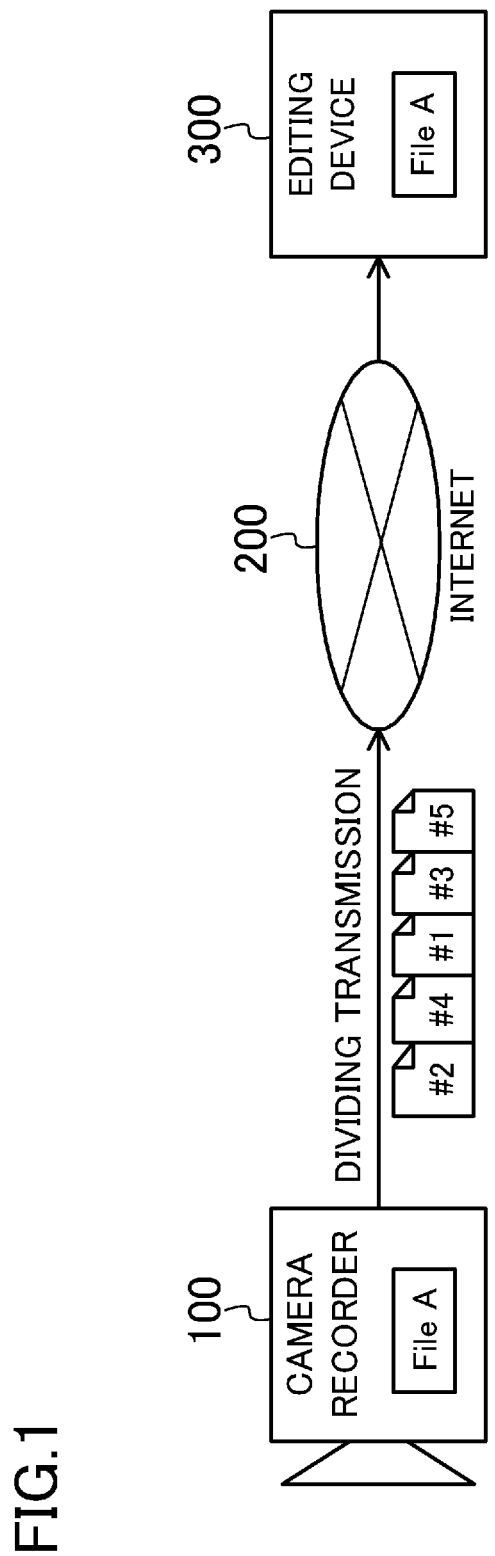
FIG. 1 is a schematic view illustrating system connection configuration according to an embodiment.

FIG. 1 is a schematic view illustrating that a camera recorder according to a first embodiment is connected to a network. A camera recorder 100 can be connected to an editing device 300 via an Internet network 200.

The camera recorder 100 captures a subject and records the captured video data. The camera recorder 100 can be connected to the Internet network 200 to transmit video data and other data. The Internet network 200 is a conventionally widely used network of the Internet. The editing device 300 is a device for editing video materials, which is connected to the Internet network 200 to receive data from the camera recorder 100. For example, a video producer records video materials using the camera recorder 100, and edits the recorded video materials using the editing device 300 to produce a work.

The camera recorder 100 according to this embodiment transmits video data in a different manner from conventionally used camera recorders. The camera recorder 100 divides video data into blocks, and transmits the blocks to the editing device 300 via the Internet network 200. This is, for example, advantageous in reducing losses at the occurrence of transmission errors and efficiently transmitting video data in a short time, when recording takes a long time to increase the total size of the video data. The editing device 300 receives the video data divided into the blocks from the camera recorder 100 via the Internet network 200, and then combines the divided blocks into the video data.

For example, FIG. 1 schematically illustrates that video data recorded as a single file is divided into blocks and then transmitted. A file (file A) as video data captured by the camera recorder 100 is divided into blocks #1-#5, and transmitted to the editing device 300. The editing device 300 combines the divided blocks #1-#5 to restore the original series of video data. The data is transmitted in the order of #2, #4, #1, #3, and #5, since the priority of the blocks #2 and #4 are set high. That is, the camera recorder 100 transmits the video data divided into blocks in the order of the priority. This preferentially transmits the video data in important periods (i.e., blocks). In addition, the editing device 300 edits the video data in the preferentially transmitted blocks, thereby reducing the time needed to produce a video picture. It is advantageous in applications such as broadcasting at the occurrence of disasters or accidents which require short-time edition and broadcast.

FIG. 2 is a schematic view illustrating example video recording operation of the camera recorder 100. In FIG. 2, video signals of an image captured by the camera are subjected to two series of recording operation. Specifically, first recording operation records a first recording video image, and second recording operation records a second recording video image. While the second recording operation records the second recording video image, for example, the first recording operation starts and stops recording the first recording video image in accordance with user's operation. In FIG. 2, the first recording video image is recorded in the periods between (2) and (3) and between (4) and (5).

The recorded second recording video image is divided at the times (2), (3), (4), and (5) when the recording of the first recording video image starts and stops. In total, the second recording video image is divided into five blocks #1-#5. Higher priority is given to the divided blocks #2 and #4, which temporally overlap the first recording video image, than the other divided blocks #1, #3, and #5 ("HIGH PRIORITY" in FIG. 2).

As such, the second recording video image is divided into the blocks at the start and stop of recording of the first recording video image, and higher priority is given to the divided blocks, which temporally overlap the first recording video image. This preferentially transmits the video images of important periods, which have been captured by the user. For example, the bit rate of the second recording video image is set lower than the bit rate of the first recording video image. This enables operation of quickly transmitting the images of important periods at the low bit rate, and then transmitting the high-bit rate images of necessary periods later.

Details of processing such as the division into the blocks and determination on the priority will be described later.

1-2. Configuration of Camera Recorder

FIG. 3 is a block diagram illustrating an example configuration of the camera recorder according to the first embodiment. The camera recorder 100 of FIG. 3 includes a camera section 101, a video recording section 120, a recording medium 105, a transmission section 106, an operating section 110, and an overlapping period detection section 111. The video recording section 120 includes an encoding section 115, a recording section 104, and a priority determination section 112. For example, a microcomputer including a memory, and a program operated by the microcomputer may form part of the configuration such as the overlapping period detection section 111 and the priority determination section 112 in FIG. 3.

The video recording apparatus according to the present disclosure includes at least the operating section 110, the video recording section 120, and the overlapping period detection section 111. The transmission section 106 may be included in the video recording apparatus or may be a device separated from the video recording apparatus.

The camera section 101 captures a subject, converts the image to video signals, and outputs the video signals. The camera section 101 is equivalent to camera sections used for conventional camera recorders.

The encoding section 115 compression-codes the video signals supplied by the camera section 101, and supplies the compression-coded video data to the recording section 104. The compression-coding here is, for example, under widely used standards such as MPEG-2, MPEG-4/AVC, or SMPTE-314M (DV-Based 25M) which is one of commercial digital VTR standards (MPEG: moving picture experts group, AVC: advanced video coding, SMPTE: society of motion picture and television engineers, VTR: video tape recorder). In this embodiment, an example will be explained where the compression-coding is performed under the MPEG-4/AVC standard, and video data has a GOP (group of picture) structure, which is widely used in video apparatuses or the like. Any compression-coding standard is acceptable in this embodiment. For example, if the recording medium 105 has sufficient recording capacity, there is no need to compression-code video signals. In this case, the video recording section 120 may not include the encoding section 115.

In this embodiment, the encoding section 115 includes two encoders 102 and 103. The encoder 102 performs compression-coding for recording the first recording video image. The encoder 103 performs compression-coding for recording the second recording video image. This is, for example, because it is often advantageous in user's operation that the first recording video image and the second recording video image have different bit rates. For example, the user can use video data at a high bit rate as a major high-definition material, and video data at a low bit rate as proxy data for transmission via the Internet network 200 and edition.

The recording section 104 records as a video file, the compression-coded video data supplied by the encoding section 115 into the recording medium 105. The compression-coded video data is recorded as the file in a conventionally known manner, and explanation thereof is thus omitted. The recording medium 105 is managed by a file system etc., as appropriate. The recording medium 105 may be included in the camera recorder 100 or may be attached to the camera recorder 100 as various types of media.

The operating section 110 receives operation instructions input by the user. For example, the operating section 110 may be buttons, a touch panel, etc. The user instructs the camera recorder 100 to start and stop recording via the operating section 110. The operating section 110 supplies information on the input instructions to the video recording section 120 and the overlapping period detection section 111.

Figure 4A:
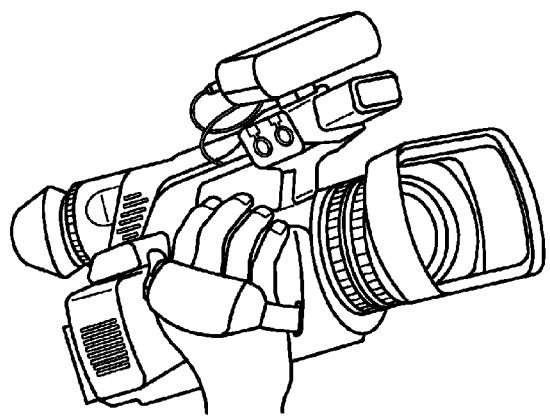
FIGS. 4A-4C illustrate example configurations of an operating section.
Figure 4B:
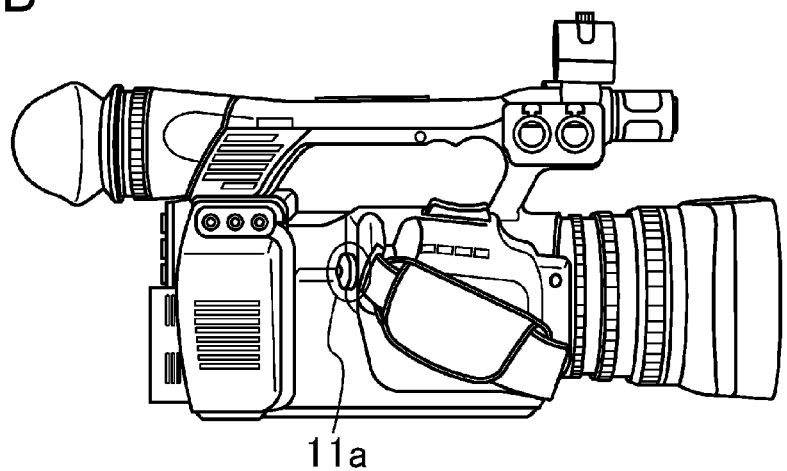
Figure 4C:
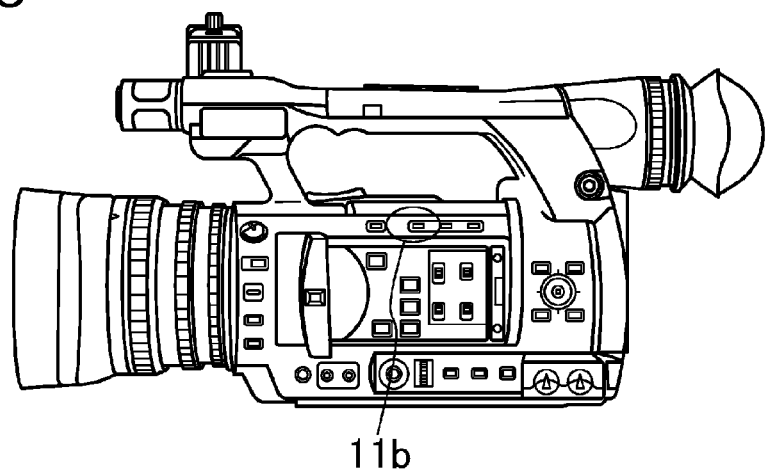

In this embodiment, the operating section 110 includes two systems of recording start and stop mechanisms to perform two individual series of recording operation. FIGS. 4A-4C illustrate example configurations of the operating section 110. FIG. 4A illustrates that the user holds the camera recorder. FIG. 4B illustrates an operation mechanism 11a for operating the first recording operation. FIG. 4C illustrates an operation mechanism 11b for operating the second recording operation. That is, in the example of FIGS. 4A-4C, the operating section 110 includes the operation mechanisms 11a and 11b. The operation mechanism 11a is located in a position to be easily operated by the user in shooting. The operation mechanism 11b is located in a position not to be easily operated by the user in shooting, for example, on a face opposite to the face at which the user holds the camera recorder with a hand. This is because, in this embodiment, the second recording operation is for obtaining continuous recording video images, and does not require frequent operation to start and stop recording.

The operating section 110 supplies operation instructions of the first recording video image to the encoder 102 and the recording section 104, and supplies operation instructions of the second recording video image to the encoder 103 and the recording section 104. Each of the encoders 102 and 103 starts encoding of the video signals in accordance with a recording start instruction supplied by the operating section 110, and stops the encoding in accordance with a recording stop instruction supplied by the operating section 110. The recording section 104 records the video data supplied by the encoder 102 in accordance with the operation instructions of the first recording video image supplied by the operating section 110. The recording section 104 also records the video data supplied by the encoder 103 in accordance with the operation instructions of the second recording video image supplied by the operating section 110.

The operating section 110 is not limited to what is shown in FIGS. 4A-4C, and may have any configuration as long as the user can start and stop recording each series of data individually. For example, the first recording operation may be performed by using a recording start and stop button, while the second recording operation may operate based on a displayed menu. In this case, for example, possible recording stop caused by user's erroneous operation can be reduced. The second recording operation may start recording at the same time as the first recording operation, and may stop recording with operation independent from the first recording operation. This case is, for example, advantageous in reducing user's work to start recording.

The overlapping period detection section 111 generates overlap information, which indicates temporal overlap between the first recording video image and the second recording video image based on an output of the operating section 110. Specifically, the overlapping period detection section 111 detects overlapping recording periods, in which the first recording video image and the second recording video image temporally overlap and are recorded, using the instructions to start and stop recording the first and second recording video images supplied by the operating section 110. The overlapping period detection section 111 generates the overlap information indicating the detected overlapping recording periods and supplies the information to the priority determination section 112.

FIG. 5 illustrates example overlap information, and corresponds to the video recording operation shown in FIG. 2. In FIG. 5, "TIME" represents the times when recording of the first recording video image starts and stops, and when recording of the second recording video image starts and stops. T(1)-T(6) represent the times (1)-(6) in FIG. 2. "RECORDING OPERATION" represents the series of recording operation performed after the times designated by the "TIME." The operation "0" represents that both of the first recording operation and the second recording operation are stopped. The operation "1" represents that only the first recording operation is performed. The operation "2" represents that only the second recording operation is performed. The operation "1 & 2" represents that the first recording operation and the second recording operation are both performed. For example, the operation "1 & 2" is set at the times T(2) and T(4), and "2" is set at the times T(1), T(3), and T(5). It is thus clear that the periods between the times (2) and (3), and between the times (4) and (5) are detected as the overlapping recording periods.

The priority determination section 112 determines positions of dividing the video data and determines the priority of the divided blocks based on the overlap information supplied by the overlapping period detection section 111. In this embodiment, the positions of dividing the second recording video image are determined at the start and stop of recording of the first recording video image. The priority of the divided blocks is determined by whether or not the divided blocks temporally overlap the first recording video image.

The priority determination section 112 issues division instructions for the encoders 102 and 103 based on the determined dividing positions. Each of the encoders 102 and 103 divides a stream into sequences based on the division instructions supplied by the priority determination section 112. This division of the sequences corresponds to the division of the video data into the blocks.

The priority determination section 112 determines the priority of the divided blocks, and generates division information on each divided block. The division information includes at least priority information indicating the priority of the divided blocks, and positional information indicating the position of each divided block in the recording video image. The recording section 104 stores the division information supplied by the priority determination section 112 in the recording medium 105. The division information is recorded in association with the video data divided into the blocks. For example, the division information may be recorded in the form of a management information file, as meta data associated with the divided blocks of the video data.

FIG. 6 illustrates example division information, and corresponds to the second recording operation of FIG. 2. "OFFSET" represents frame offsets (i.e., frame numbers) between the head of the video data and the respective dividing positions. The time (1) of FIG. 2 corresponds to "0" (i.e., the head frame), the time (2) corresponds to frames "123," the time (3) corresponds to frames "234," the time (4) corresponds to frames "345," and the time (5) corresponds to frames "456." "PRIORITY" represents the priority information.

Highest priority is given to value 1. The priority decreases with the increasing numerical value. "RECORDING MODE" represents the recording modes after the dividing positions. The states indicated by the values are similar to the "RECORDING OPERATION" of FIG. 5 showing the overlap information. "MEMO" represents character string information freely used by the user. The recording section 104 may set character strings such as "START OF #1" to the "MEMO" so that the user can identify the divided block.

The recording section 104 may associate the second recording video image, which has been divided into the blocks, with the first recording video image via the management information file. For example, in the example of FIG. 6, the "OFFSET" position of the second recording video image is associated with the head position of the first recording video image at the time when the "RECORDING MODE" is "1&2." This associates the head position of the first recording video image with the position of the second recording video image where the "OFFSET" is "123," for example.

The management information file may be recorded, for example, in a CSV (comma separated value) format, which includes a text file and separates elements by commas. Specifically, in recording the above-described meta data as the management information file, the recording section 104 converts the elements shown in FIG. 6 to character strings, sequentially separates them with commas, and forms a text file adding a line feed after each line. The management information file is associated with the video file under the same file name. For example, if the video file is named "0000.mxf," the recording section 104 may name the management information file "0000.cvs." As such, the files are associated under the name "0000" excluding their extensions.

The transmission section 106 reads the video data recorded as the video file from the recording medium 105, and transmits the video data outside the camera recorder 100. The transmission section 106 can be connected to the editing device 300 via the Internet network 200 to transmit the video data to the editing device 300. The transfer protocol is, for example, FTP (file transfer protocol), HTTP (hypertext transfer protocol), or RTP (real-time transport protocol). The transmission may be made by such conventionally used protocols.

The transmission section 106 reads the division information recorded into the recording medium 105, determines the order of transmitting the divided blocks in accordance with the priority information included in the division information, reads the video data divided into the blocks from the recording medium 105, and then transmits the divided video data.

While an example has been described where the encoding section 115 includes the two encoders 102 and 103, the configuration is not limited thereto. For example, the encoding section 115 may include a single encoder. In this case, common video data generated by compression-coding may be overlappingly recorded as a plurality of recording video images.

While in this embodiment, an example has been described where the single recording medium 105 is used, the configuration is not limited thereto. For example, the encoders 102 and 103 may independently record the compression-coded video data in two or more recording media.

2. Operation

The operation of the camera recorder 100 configured as above will be described below. As shown in FIG. 2, the recording time of the second recording operation is longer than that of the first recording operation. The second recording video image is divided at the start and stop of recording of the first recording video image. For example, this corresponds to the case where the second recording operation is determined as long-time recording.

2-1. Recording Operation

The user gives instructions to start and stop recording the first and second recording video images, for example, via the operating section 110 shown in FIGS. 4A-4C. Upon receipt of the instruction to start recording the first recording video image, the encoder 102 starts compression-coding the video signals, and the recording section 104 records the compression-coded video data as the first recording video image into the recording medium 105. On the other hand, upon receipt of the instruction to stop recording the first recording video image, the encoder 102 stops compression-coding the video signals, and the recording section 104 stops recording the first recording video image. Upon receipt of the instruction to start recording the second recording video image, the encoder 103 starts compression-coding the video signals, and the recording section 104 records the compression-coded video data as the second recording video image into the recording medium 105. Upon receipt of the instruction to stop recording the second recording video image, the encoder 103 stops compression-coding the video signals, and the recording section 104 stops recording the second recording video image.

2-1. Overlapping Period Detection Processing

The overlapping period detection section 111 detects the overlapping recording periods based on the output of the operating section 110, i.e., the instructions to start and stop recording the first recording video image, and the instructions to start and stop recording the second recording video image. The overlapping period detection section 111 generates, for example, the overlap information shown in FIG. 5, and supplies the overlap information to the priority determination section 112.

The overlap information is supplied from the overlapping period detection section 111 to the priority determination section 112 in accordance with every instruction to start and stop recording the first and second recording video images. That is, in the example of FIG. 5, the overlap information is supplied at six times from the time T(1) to the time T(6).

2-3. Video Data Division Processing

The priority determination section 112 determines the dividing positions of video data based on the overlap information supplied by the overlapping period detection section 111. In this embodiment, the priority determination section 112 determines the dividing positions of the second recording video image recorded by the second recording operation. For example, according to the overlap information of FIG. 5, it is found that the first recording operation starts at the time T(2). Then, the priority determination section 112 determines the time T(2) as a dividing position of the second recording video image, and instructs the encoder 103 to divide the image.

The encoder 103 divides sequences of a stream into blocks based on the division instructions supplied by the priority determination section 112. In this embodiment, since the compression-coding is performed under the MPEG-4/AVC standard, the picture in a designated dividing position may be, for example, an IDR (instantaneous decoding refresh) picture. The reference relation may be controlled so that B pictures and P pictures do not refer to the pictures prior to the IDR picture.

Figure 7:
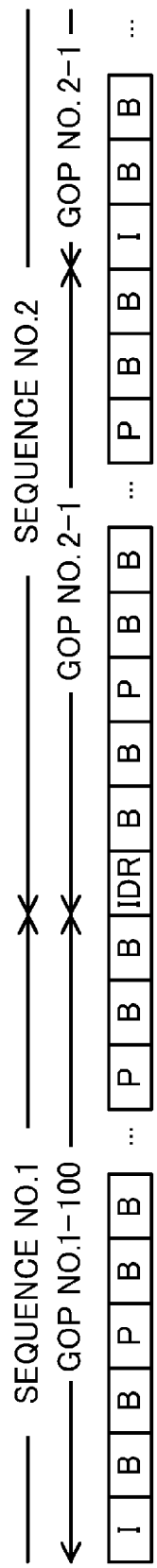
FIG. 7 illustrates example division of video data into blocks.

FIG. 7 illustrates example division of video data into blocks. FIG. 7 shows that the compression-coded video data (stream) are segmented on a picture-by-picture basis. The stream is divided into two sequences of "SEQUENCE NO. 1" and "SEQUENCE NO. 2." In the example of FIG. 7, the sequences are segmented using an IDR picture as the head picture of "SEQUENCE NO. 2." For example, in reproducing this video data, this segmentation allows a reproducing apparatus to start decoding from the head picture (i.e., the dividing position) of "SEQUENCE NO. 2." Without this segmentation, the reproducing apparatus may not start decoding from the dividing position. Furthermore, information indicating the end of the sequence, which is defined under the MPEG-4/AVC standard, may be given immediately before the IDR picture (i.e., the end of video data of "SEQUENCE NO. 1" in FIG. 7) to clearly show the segment between the sequences.

In using the GOP structure, an I picture immediately after a dividing position may be an IDR picture. This makes the GOP periods constant, thereby reducing the implementation load and the steps for implementation, as compared to the case where IDR pictures are provided in arbitrary positions. In most cases, each GOP period generally ranges from about 0.5 seconds to about 1 second. The time difference between the user's operation and each dividing position is rarely problematic. In this case, the camera recorder 100 operates to temporally match the position of a video frame in which recording of the first recording starts with the position of a video frame in which the second recording video image is divided. This operation can be made by the instructions of the operating section 110 to start recording and instructions of the priority determination section 112 to divide the data on a GOP period-by-GOP period basis. Each GOP period is the period between an I or IDR picture and the next I or IDR picture. The GOP structure here is similar to the GOP structure under the MPEG-2 standard.

The first recording video image may be divided similarly.

2-4. Priority Determination Processing

Next, the priority determination section 112 determines the priority of the divided blocks based on the overlap information. Then, the priority determination section 112 generates division information on each divided block, and transmits the division information to the recording section 104. The recording section 104 records the supplied division information as the management information file into the recording medium 105 in association with the second recording video image.

For example, as shown in FIG. 8, generation of the division information of FIG. 6 based on the overlap information of FIG. 5 will be described. In FIG. 8, the row of the time T(1) corresponds to the row of the offset "0," the rows of the times T(2), T(3), T(4), and T(5) correspond to the rows of the offsets "123," "234," "345," and "456," respectively. In FIG. 8, no division information corresponds to the row of the time T(6). This is because, in this embodiment, the division information is given to the second recording video image, and the block after the time T(5) is regarded as the period until the end of the second recording operation.

The priority determination section 112 executes generation processing of the division information every time when the overlap information is supplied. Specifically, in FIG. 8, the priority determination section 112 executes the generation processing of the division information at six times from the time T(1) to the time T(6).

In the generation processing of the division information, the priority determination section 112 sets the values of "OFFSET," "PRIORITY," "RECORDING MODE," and "MEMO." The priority determination section 112 counts the number of the frames from start of recording in the second recording operation, and sets the count value at a time of division as an "OFFSET." For example, the count may be performed as follows. The camera section 101 or the encoding section 115 performs interruption in each video frame, and the priority determination section 112 counts the number of interruption.

The values of the "PRIORITY" are determined based on the values of the "RECORDING OPERATION" of the overlap information. A conditional expression for the determination is set in advance to the priority determination section 112. For example, where "RECORDING OPERATION" of the overlap information is "2" and "1&2," the values of "PRIORITY" may be "10" and "5," respectively. This is because this embodiment gives importance to the periods in which the first recording operation overlaps the second recording operation. In this table, the value 5 has higher "PRIORITY" than the value 10. When "RECORDING OPERATION" as the overlap information is "0," the priority determination section 112 generates no corresponding division information. The recording operation 0 as the overlap information indicates that both of the first recording operation and the second recording operation are stopped. There is thus no need to determine the priority. The value of the priority may be changed as appropriate, for example, by using other meta data such as Mark indicating specific periods or positions of the video data. If a Mark indicating the importance is recorded in association with the image between the time T(2) and the time T(3), the priority determination section 112 may give high priority (i.e., a small "PRIORITY" value) to the period. That is, the determination on the priority is not limited to what is shown in this embodiment.

The values of the "RECORDING MODE" are identical to the values of "RECORDING OPERATION" as the overlap information. The "MEMO" represents a given character string. For example, it may be a character string such as "START OF #1" clearly indicating a dividing position. A counter may be provided, which increments its count in every dividing position of the second recording operation and assigns a character string "START OF #" before the character string of the value. The "MEMO" is the information to be provided to the user, and may be any character string.

2-5. Example Video Recording Operation

Figure 9:
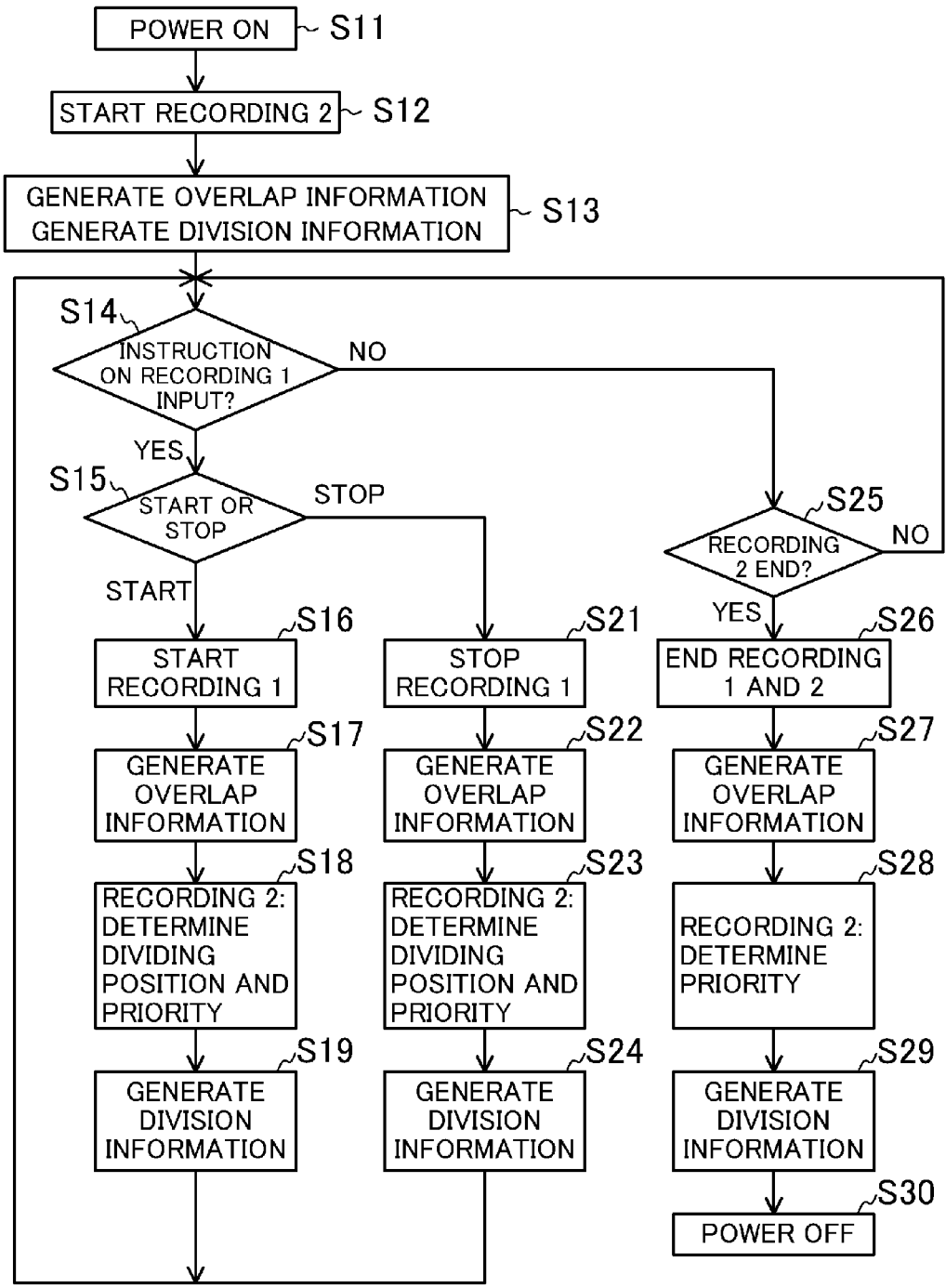
FIG. 9 is a flow chart illustrating example video recording operation according to the embodiment.

FIG. 9 is a flow chart illustrating example video recording operation according to this embodiment. First, the user powers on the camera recorder 100 (S11). When the user operates the operating section 110 (e.g., the operation mechanism 11b of FIG. 4C) to start the second recording operation, the second recording operation starts (S12). For example, the camera recorder 100 may be configured to automatically start the second recording operation by power-on. In accordance with the start of the second recording operation, the overlapping period detection section 111 generates first overlap information, and the priority determination section 112 generates first division information (S13).

Then, the user operates the operating section 110 (e.g., the operation mechanism 11a of FIG. 4B) to start and stop recording the first recording video image (S14-S24). When an operation instruction is input (Yes in S14), which is an instruction to start the first recording operation (S15), the recording of the first recording video image starts (S16). In accordance with the start of the first recording operation, the overlapping period detection section 111 generates overlap information (S17), and the priority determination section 112 determines dividing positions and the priority (S18), and generates division information (S19). On the other hand, an operation instruction is input (Yes in S14), which is an instruction to stop the first recording operation (S15), the recording of the first recording video image stops (S21). In accordance with the stop of the first recording operation, the overlapping period detection section 111 generates overlap information (S22), and the priority determination section 112 determines dividing positions and the priority (S23), and generates division information (S24).

When the user operates the operating section 110 (e.g., the operation mechanism 11b of FIG. 4C) to end the second recording operation (YES in S25), recording of both of the first recording video image and the second recording video image ends (S26). Then, the overlapping period detection section 111 generates the last overlap information (S27), and the priority determination section 112 determines the priority (S28), and generates the last division information (S29). After that, the user powers off the camera recorder 100 (S30).

2-6. Transmission Processing

The transmission section 106 transmits the video data, which has been divided into the blocks, and the division information. The transmitted division information is associated with the video data divided into the blocks, and includes information needed to restore the video data divided into the blocks. In this embodiment, the division information includes, for example, the name of the original file, and the head offsets of the corresponding blocks.

The transmission processing may be performed, for example, using the transfer protocol such as the FTP and the HTTP. In this embodiment, the transmission processing can be performed by conventionally widely used techniques. In transmission using the FTP, for example, the transmission section 106 may be an FTP client, and a receiving section 301 of the editing device 300 may be an FTP server. Any configuration is applicable as long as the transmission section 106 matches with the editing device 300, and the editing device 300 combines the video data divided into the blocks to restore the video data before the transmission. That is, the transmission section 106 and the receiving section of the editing device 300 need to correspond to the same transfer protocol and the same transmission means.

For example, if the FTP is used as the transfer protocol, the video data divided into the blocks is handled as virtual files. In this case, when the video data is recorded into the recording medium 105, a file may be generated for each divided block. Alternatively, the entire video data is recorded as a single file into the recording medium 105, and a virtual file may be generated for each divided block when the data is transmitted.

Figure 10:
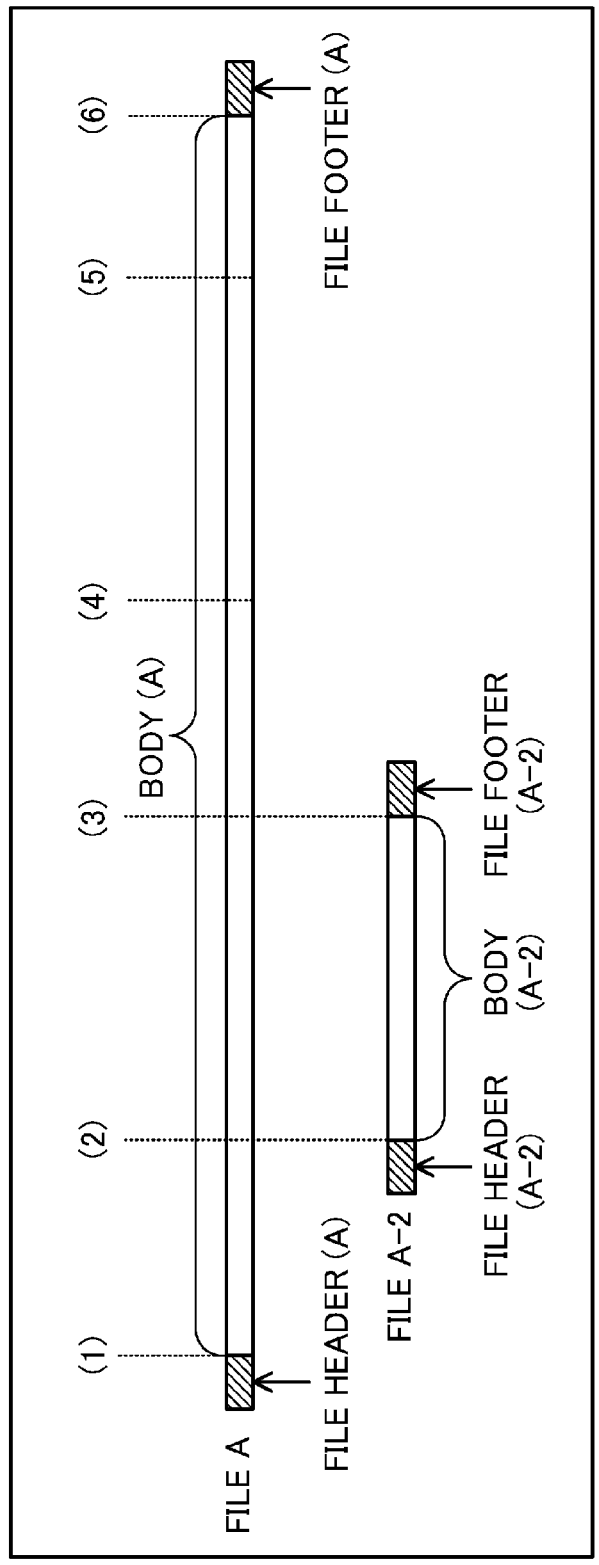
FIG. 10 is a schematic view illustrating example generation of a virtual file to be transmitted.

FIG. 10 schematically illustrates example generation of a virtual file. FIG. 10 illustrates an example where the transmission section 106 generates a virtual file (File A-2) corresponding to the divided blocks from an actual file (File A) of the second recording video image recorded into the recording medium 105. As shown in FIG. 10, the transmission section 106 may attach file header information ("FILE HEADER (A-2)" in the figure) and file footer information ("FILE FOOTER (A-2)" in the figure) to the video data ("BODY (A-2)" in the figure) between the divided blocks (2) and (3). The file header information and the file footer information may be generated based on, for example, file wrapping information, similar to recording of the video data to the recording medium 105 using the recording section 104.

3. Editing Device 3-1. Configuration

Figure 11:
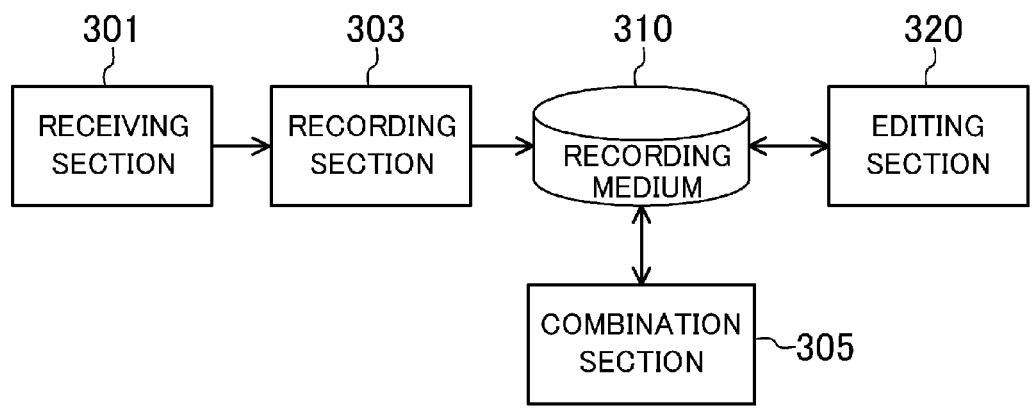
FIG. 11 is a block diagram illustrating an example configuration of an editing device.

FIG. 11 is a block diagram illustrating an example configuration of the editing device. The editing device 300 of FIG. 11 includes the receiving section 301, a recording section 303, a combination section 305, a recording medium 310, and an editing section 320. In this embodiment, the editing device 300 includes a general purpose computer, and a program operating in the computer. The editing device 300 according to this embodiment may include the receiving section 301 and the combination section 305 in addition to a conventionally used non-linear editing device.

The receiving section 301 receives the video data, which has been transmitted from the transmission section 106 of the camera recorder 100, via the Internet network 200, for example, on a divided block-by-divided block basis. The receiving section 301 needs to correspond to the same transfer protocol and the same transmission means as the transmission section 106 of the camera recorder 100. The receiving section 301 supplies the received video data to the recording section 303.

The recording section 303 records, as a file, the video data and the division information supplied by the receiving section 301 into the recording medium 310. The recording medium 310 is managed by a file system, etc., as appropriate. The division information is recorded as the file, and associated with the video data, for example, under the same file name as the video file. This recording section 303 may be implemented by a technique generally used for video recording apparatuses, etc.

The recording section 303 records the video data and the division information into the recording medium 310 immediately after being supplied. As a result, a duration result of combination can be recorded into the recording medium 310, before restoration of all the divided blocks is complete. Therefore, important scenes can be edited, before the transmission of the video data of all the divided blocks is complete.

The combination section 305 combines the video data, which has been divided into the blocks and recorded into the recording medium 310, and then, records the combined video data into the recording medium 310 again. The video data combination processing will be described later.

The editing section 320 reads the video data recorded into the recording medium 310, and edits the video image. The editing section 320 has functions to, for example, delete unnecessary part of the video data or process the video data, for example, based on the user's operation. The functions of the editing section 320 may be implemented by generally used techniques using non-linear editing devices, etc.

3-2. Video Data Combination Processing

The combination section 305 combines the video data transmitted as the divided blocks, and restores the whole or part of the original video data. First, the combination section 305 determines the order of combination based on the division information recorded into the recording medium 310. Then, the combination section 305 performs combination processing of the video data based on the determined order. The combination section 305 holds information on the procedure of the combination as combination information for each combined video data, and records the information as a file into the recording medium 310. In this embodiment, the combination information is for managing the division information as the duration result of the combination, and completion of the combination. The combination information includes, for example, the name of the original file, the head offsets of the divided blocks, and a combination completion flag.

Determination on the order of combination will be described in detail. The combination section 305 determines that the divided blocks under the same file name (i.e., character string) as the "name of the original file" belong to a group of combination targets. That is, the combination section 305 regards the divided blocks included in the group as candidates to be combined into the same video data (i.e., file). Next, the combination section 305 determines the order of combination among the group of the combination targets in order of increasing head offset of the divided block. Then, the combination section 305 checks the distance between each adjacent pair of the divided blocks in the order of combination. If there is no space, the combination section 305 performs combination processing of the divided blocks. If there is space, the combination section 305 does not combine the divided blocks.

Figure 12:
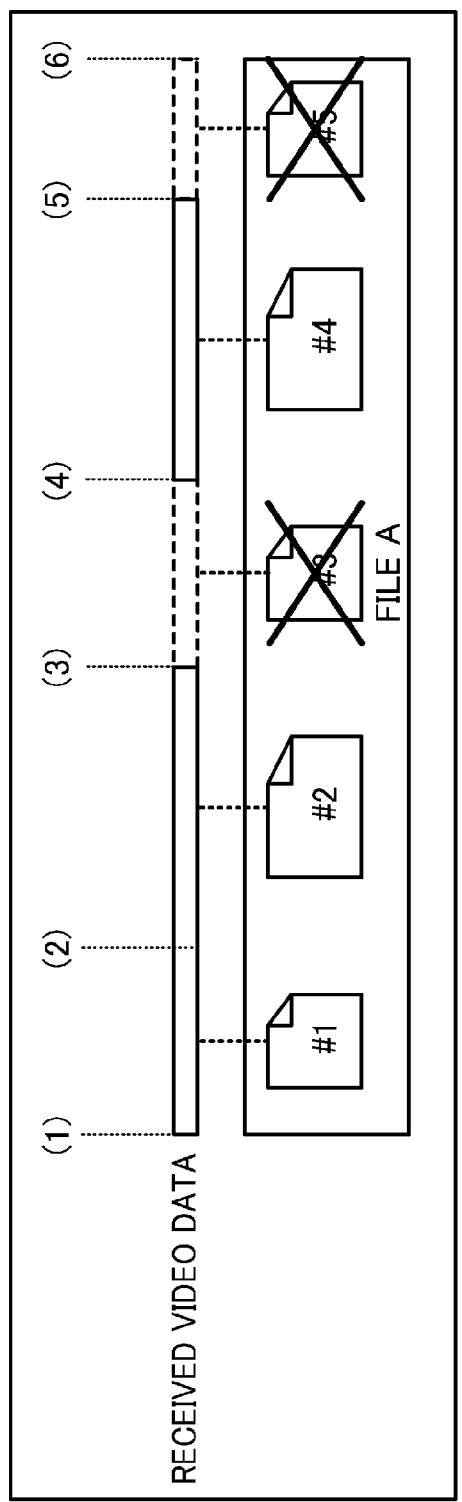
FIG. 12 is a schematic view illustrating example video data combination processing of the editing device.

FIG. 12 illustrates the state of the video data received by the editing device 300 on the assumption of the example of FIG.

2. For example, as shown in FIG. 12, the blocks #3 and #5 are not transmitted, the blocks #1 and #2 are combined. After the combination processing, the video data of the two periods between the times (1) and (3), and between the times (4) and (5) are recorded into the recording medium 310.

The combination section 305 performs combination processing of the video data based on the blocks to be combined and the order of combination. Specifically, the combination section 305 continuously reads the video data from the recording medium 310 in the order of combination, and records the read video data into the recording medium 310 again. The video data may be combined not by reading the data from the recording medium 310, but by changing file management tables in the file system of the recording medium 310. In this case, the combination is completed in a short time, but the processing is more complicated than the combination made by reading the recording medium 310.

Next, generation processing of the combination information will be described. The "name of the original file" of the combination information corresponds to the "name of the original file" included in the division information, and the same file name (i.e., character string) is given. The "head offsets of the divided blocks" are included in the division information on the video data, which will be the head of the video data after the combination. The combination completion flag is set to indicate "complete" when the combination of all the divided blocks is complete, and "incomplete" at other times. Specifically, if the editing device 300 has not received all the original blocks to be restored, the combination completion flag is set to indicate "incomplete." The combination section 305 determines whether or not the combination is complete with reference to the combination completion flag. For example, if the combination is incomplete, the combination section 305 performs further combination processing upon receipt of new divided blocks, and completes the combination. The combination information is recorded as a file into the recording medium 310 similar to the division information, and used as the division information for performing further combination processing.

By the above-described processing, the division information and the video data recorded as the files into the recording medium 310 can be handled as files even when the transmission is incomplete. As a result, partially transmitted video data is subjected to operation such as edition.

The combination section 305 detects the association between the second recording operation and the first recording operation based on the meta data recorded as the management information file into the recording medium 105 of the camera recorder 100. For example, in the example of FIG. 8, when the "RECORDING MODE" is "1 & 2," recording start positions of the first recording operation and the second recording operation are associated. That is, temporal association between the first recording video image and the second recording video image is made. That is, the editing device 300 identifies other series of recording image data based on one series of recording image data. This allows the user to search video data, which have been recorded at the same time. This association can be made as follows. The transmission section 106 of the camera recorder 100 transmits the meta data to the receiving section 301 of the editing device 300, and the editing device 300 records the meta data into the recording medium 310 together with the video data and refers to the recorded meta data.

1-4. Advantages etc.

As described above, in this embodiment, the video recording apparatus, which records the video signals as the plurality of recording image data, includes the operating section 110, the video recording section 120, and the overlapping period detection section 111. The operating section 110 receives the user's operation instructions such as the instructions to start and stop recording the first recording video image. The video recording section 120 records the second recording video image into the recording medium 105, and records the first recording video image into the recording medium 105 in accordance with the operation instruction, which has been input to the operating section 110. The overlapping period detection section 111 generates the overlap information indicating the temporal overlap between the first recording video image and the second recording video image from the output of the operating section 110. The video recording section 120 divides the second recording video image into the blocks, and records the divided blocks into the recording medium 105 in synchronization with the start and stop of recording of the first recording video image. The video recording section 120 determines the priority of the divided blocks of the second recording video image based on the overlap information. The video recording section 120 generates the division information on each divided block of the second recording video image, and records the division information into the recording medium 105.

As a result, the second recording video image is divided into the blocks and recorded in synchronization with the start and stop of recording of the first recording video image. The division information indicating the priority and the position of each divided block is recorded together. This preferentially transmits high priority divided blocks of the second recording video image, for example. In addition, since the second recording video image is divided into the blocks in synchronization with the start and stop of recording of the first recording video image, there is no need for the user to perform operation for dividing the data into blocks. Therefore, important video data is preferentially transmitted, while reducing user's operational burdens.

Other Embodiments

As described above, the first embodiment has been described as example techniques disclosed in the present application. However, the techniques according to the present disclosure are not limited to the embodiment, but are also applicable to those where modifications, substitutions, additions, and omissions are made as appropriate. In addition, elements described in the first embodiment may be combined to provide a different embodiment.

Other embodiments will be provided below.

In the first embodiment, the second recording video image recorded into the recording medium 105 is transmitted on a divided block-by-divided block basis in accordance with the priority. Instead, for example, the transmission section 106 may transmit the second recording video image recorded into the recording medium 105 together with the division information recorded into the recording medium 105. In this case, the editing device 300, which receives the second recording video image, extracts important video images from the second recording video image based on the priority information and the positional information included in the division information.

In the first embodiment, the second recording video image is divided into the blocks in synchronization with the start and stop of recording of the first recording video image, the configuration is not limited thereto. For example, the timing may be slightly different. The image may be divided into the blocks based not on both of the start and stop of the recording, but on one of the start or stop of the recording. That is, the second recording video image may be divided into the blocks based on at least one of the start or stop of recording of the first recording video image.

Alternatively, for example, the second recording video image may be divided into the blocks at a predetermined time before start of the recording of the first recording video image. This reliably includes important video images in high priority blocks, even the user's operation instruction to start recording is delayed by, for example, occurrence of important events. The predetermined time may be, for example, about several seconds. For example, the second recording video image may be divided into the blocks at the start of the recording of the first recording video image, and at a predetermined time after the start of the recording. This prevents unnecessary scenes from being included in high priority blocks, for example, even when the user forgets to stop recording.

In the first embodiment, an example has been described where the Internet network 200 is used as an example connecting communication channel. The communication channel may be any communication channel which connects the camera recorder 100 to the editing device 300. Thus, the communication channel is not limited to the Internet network 200. However, when the Internet network 200 is used as a communication channel, communications to distant places are possible at low costs.

In the first embodiment, the text file in the CSV format is used as an example management information file. Any file format is acceptable, as long as meta data can be recorded in association with video data. Thus, the management information file is not limited to the CSV format. For example, images may be recorded utilizing XML (extensible markup language), which is one of markup languages.

In the first embodiment, an example has been described where the video recording apparatus is applied to the camera recorder. The video recording apparatus according to the present disclosure is applicable to equipment other than camera recorders. For example, an video image input may be included in place of the camera section 101. In this case, video data may be input using HD-SDI (high definition serial digital interface) under SMPTE-292M standard, which is generally used for business purposes.

In the first embodiment, an example has been described where the transmission section 106 of the camera recorder 100 reads the video data from the recording medium 105. The transmission section 106 may be directly connected to the recording section 104. In this case, the transmission section 106 may receive the information such as the video data from the recording section 104 as a supplier. Thus, what is to be connected to the transmission section 106 is not limited to the recording medium 105. However, when the transmission section 106 is connected to the recording medium 105, functions may be clearly divided and implementation is facilitated.

In the first embodiment, an example has been described where the camera recorder 100 performs two series of recording operation. Three or more series of recording operation may be performed. In this case, the same number of encoders as the series may be provided to perform the above-described control.

In the first embodiment, an example has been described where the camera recorder 100 has the two encoders 102 and 103. Instead, a single encoder may be used. In this case, for example, the encoder performs operation similarly to the encoder 103 of the first embodiment. A recording section may perform operation of the second recording video image, similar to the recording section 104 of the first embodiment. As the first recording video image, outputs of the encoder may be recorded to overlap the second recording video image in accordance with operation instructions from the operating section 110. The division into the blocks and the priority determination may be performed similarly to the first embodiment.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

The present disclosure is applicable to video recording apparatuses preferentially transmitting important video data, while reducing user's operational burdens. Specifically, the present disclosure is useful, for example, for camera systems for broadcasting, etc.

What is claimed is:

1. A video recording apparatus recording video signals as a plurality of recording image data including first and second recording video images, the apparatus comprising:
   an operating section configured to receive user's operation instructions including instructions to start and stop recording the first recording video image;
   a video recording section configured to record the second recording video image into a recording medium, and record the first recording video image into the recording medium in accordance with the instructions to start and stop recording, which have been input to the operating section; and
   an overlapping period detection section configured to generate overlap information indicating temporal overlap between the first recording video image and the second recording video image from an output of the operating section, wherein
   the video recording section divides the second recording video image into blocks at timing based on at least one of start or stop of recording of the first recording video image, and records the divided blocks into the recording medium,
   the video recording section determines priority of the divided blocks of the second recording video image based on the overlap information, and
   the video recording section generates division information on each divided block of the second recording video image including at least priority information indicating the determined priority and positional information indicating a position of the divided block in the second recording video image, and records the generated division information into the recording medium.

2. The video recording apparatus of claim 1, wherein
   the video recording section sets priority of one(s) of the divided blocks of the second recording video image, which temporally overlap(s) the first recording video image, higher than priority of the other one(s) of the divided blocks, which do(es) not temporally overlap the first recording video image.

3. The video recording apparatus of claim 1, further comprising:
a transmission section configured to transmit information recorded into the recording medium, wherein
the transmission section has a function to transmit the second recording video image recorded into the recording medium on a divided block-by-divided block basis in accordance with the priority information included in the division information.

4. The video recording apparatus of claim 3, wherein
the transmission section transmits the positional information included in the division information together with the second recording video image.

5. The video recording apparatus of claim 1, further comprising:
a transmission section configured to transmit the second recording video image recorded into the recording medium together with the division information.

6. The video recording apparatus of claim 1, wherein
the video recording section divides the second recording video image into the blocks in synchronization with the start and the stop of recording of the first recording video image.

7. The video recording apparatus of claim 1, wherein
the video recording section divides the second recording video image into the blocks at a predetermined time before the start of the recording of the first recording video image.

8. The video recording apparatus of claim 1, wherein
the video recording section divides the second recording video image into the blocks at timing based on the start of the recording of the first recording video image, and at a predetermined time after the start of the recording.

9. The video recording apparatus of claim 1, wherein
the video recording section includes an encoding section configured to compression-code the video signals and output the compression-coded signals as the first and second recording video images, and
the encoding section compression-codes the first recording video image at a higher bit rate than the second recording video image.

10. A camera recorder comprising:
the video recording apparatus of claim 1; and
a camera section configured to output the video signals obtained by capturing a subject to the video recording apparatus.

\* \* \* \* \*